United States Patent [19]

Deutschmann et al.

[11] Patent Number: 4,616,480
[45] Date of Patent: Oct. 14, 1986

[54] CONTROL SYSTEM FOR THE ENGAGEMENT AND DISENGAGEMENT OF AN EXHAUST GAS TURBOCHARGER

[75] Inventors: Herbert Deutschmann, Friedrichshafen; Gerd-Michael Wolters, Markdorf, both of Fed. Rep. of Germany

[73] Assignee: MTU Motoren- und Turbinen-Union Friedrichshafen GmbH, Del.X

[21] Appl. No.: 638,498

[22] Filed: Aug. 7, 1984

[30] Foreign Application Priority Data

Sep. 30, 1983 [DE] Fed. Rep. of Germany ....... 3335471

[51] Int. Cl.⁴ ............................................. F02B 37/12
[52] U.S. Cl. ...................................... 60/600; 60/612; 137/87
[58] Field of Search ................. 60/600, 601, 602, 603, 60/612; 137/87

[56] References Cited

U.S. PATENT DOCUMENTS 2,359,615 10/1944 Browne et al. .................. 60/612 X
4,418,536 12/1983 Deutschmann ...................... 60/602

FOREIGN PATENT DOCUMENTS 3002474 7/1981 Fed. Rep. of Germany ........ 60/600
3234495 3/1984 Fed. Rep. of Germany ........ 60/600
561932 6/1944 United Kingdom .................. 60/600
2117826 10/1983 United Kingdom .................. 60/612

Primary Examiner—Michael Koczo
Attorney, Agent, or Firm—Craig & Burns

[57] ABSTRACT

A control for the engagement and disengagement of an exhaust gas turbocharger in which the charging air pressure of the internal combustion engine is used as control magnitude for the engagement and disengagement. Unfortunately, this charging air pressure exhibits oscillations with large amplitudes after each engagement and disengagement which could trigger faulty shifting operations in the control. To alleviate this problem, the control line (44) between the charging-air line and the control slide valve members (40, 41) is always closed off when these oscillations occur and their negative effects on the control are thereby prevented.

11 Claims, 4 Drawing Figures

CONTROL SYSTEM FOR THE ENGAGEMENT AND DISENGAGEMENT OF AN EXHAUST GAS TURBOCHARGER

The present invention relates to a control system for the engagement and disengagement of at least one exhaust gas turbocharger of a piston internal combustion engine, which controls a working medium for the actuation of the closure devices of the exhaust-gas and charging-air line of the exhaust gas turbocharger and to which the charging air pressure of the piston internal combustion engine is supplied as control magnitude by way of a control system.

The disconnection of exhaust gas turbochargers is carried out with piston internal combustion engines for increasing the charging air pressure and charging air quantity with an exhaust gas energy yield reduced compared to the full load operation, i.e. in the partial load and partial rotational speed range of the piston internal combustion engine. Only one exhaust gas turbocharger thereby operates in case of low exhaust gas energy yield, whereby one or several exhaust gas turbochargers are gradually and additionally connected in parallel with the one exhaust gas turbocharger with an increase of the output of the piston internal combustion engine, until finally at full load operation all existing exhaust gas turbochargers work together. The charging air pressure attainable therewith has a sawtooth-like curve for each engaged exhaust gas turbocharger combination plotted against output or rotational speed. During the engagement of the additional exhaust gas turbocharger, at first a decrease of the charging air pressure occurs, caused by the decrease of the exhaust gas pressure by reason of the opening of the exhaust gas closure device of the exhaust gas turbocharger to be additionally engaged. Thereafter, the charging air pressure increases with an increasing output, until a decrease occurs again when the next turbocharger is additionally engaged.

In order to avoid, after a shifting operation, the immediate shifting back into the condition prior to this shifting operation, which would necessarily result by reason of the described curve of the charging air pressure, a control system is known (German Patent Application P 32 12 498), in which two control pressures act on two control surfaces of a slide member of a control shifting device in such a manner that with a high charging air pressure the slide member is pressed into the position for the engagement of the exhaust gas turbocharger and with a lower charging air pressure into the position for the disengagement of the exhaust gas turbocharger.

The occurrence of strong charging air pressure fluctuations following a shifting operation have thereby proved disadvantageous which, also for avoiding a shifting back into the condition prior to the shifting operation, makes necessary the provision of a large shifting hysteresis. This large shifting hysteresis requires a widening of the operating ranges of the turbocharger groups, which during longer operation in proximity of the shifting point with fewer turbochargers, entails the danger of an overheating of these turbochargers, or with more turbochargers, causes the occurrence of a charging air shortage and of a poor combustion process.

It is the object of the present invention to prevent the effects of the charging air pressure fluctuations at the end of a shifting operation on the shifting behavior of the control system.

The underlying problems are solved according to the present invention in that after each engagement or disengagement of the exhaust gas turbocharger, the control line is closed off and is again opened up after the passage of a predetermined period of time.

As a result of this measure, the control system can be effectively isolated in a simple manner from the influences of the charging air pressure fluctuations without having to accept thereby any other disadvantages. The size of the hysteresis can be limited to the extent necessary for avoiding oscillations during the shifting.

An unequivocal signal for the closing off can be obtained in that the closing of the control line is realized in dependence on the pressure increase or on the pressure decrease in the working medium line between the control system and the closure devices of the exhaust gas turbocharger. Since such a pressure increase or decrease always effects an engagement, respectively, disengagement, it represents a very accurate signal for the beginning of the closing operation.

However, it is also possible that the closing of the control line can be effected by the change of the charging air pressure caused by the shifting operation. Since with each shifting operation a steep increase of the charging air pressure (during disengagement of a turbocharger) respectively a steep drop of the charging air pressure (during engagement of a turbocharger) occurs, the control line is closed in each case during the occurrence of the pressure fluctuations at the end of the shifting operation.

A simple and operationally reliable development of the shutoff valve for the control pipe has a piston that is arranged in the housing and forms two working spaces with the housing and in its inoperative position determined by spring force, keeps open the control pipe for the passage of the charging air, but shuts off the control pipe in its two end positions. The two working spaces are connected with one another via a throttling means, in which case the first working space is connected with an equalizing space and the second working space is acted upon by a control means. When the pressure in the control means is changed, only the pressure in the second working space is changed at first, and as a result thereof shifts the piston out of its inoperative position shutting off the control pipe. It is only after the pressures in both working spaces via the throttle have equalized themselves to one another, that the piston resumes its inoperative position and thus opens the control line. The time that the piston requires for this purpose, among other things, depends on the throttle cross section and on the size of the equalizing space.

By changing the throttle diameter and the volume of the equalizing space and by changing the spring stiffness and the control piston diameter, the duration of the blocking time of the control pipe and the response slope of the pressure change, respectively, can be adjusted within wide limits and be adapted to requirements.

A clear signal for the blocking of the control pipe can be achieved by the fact that the second working space is connected with an actuating pipe of the control.

Since a pressure change in an actuating pipe always takes place when an exhaust gas turbo-supercharger is connected or disconnected, thus when vibrations take place, the blocking caused by the pressure change always takes place at the right moment.

Thus the shutoff valve also receives the correct control impulses when the second working space is connected with the charging air pipe of the internal combustion engine. Since in the case of each switching operation, a steep rise occurs in the charging air pressure (during the disconnection), or a steep fall of the charging air pressure (when a charger is connected), the control pipe is always blocked, when pressure fluctuations occur at the end of the switching.

When the second working space of the control valve is connected with the charging air pressure of the internal-combustion engine, a blocking of the control pipe may also take place in the case of normal charging air pressure changes, for example, in the case of an acceleration process of the internal-combustion engine or in the case of a sudden power reduction. This must be avoided because otherwise the switching is not triggered when the intended charging pressure is reached. A blocking can be avoided by the fact that the two working spaces of the shutoff valve are connected via another throttle and a pipe and that the pipe is blocked when the piston deviates from its inoperative position. This connection short-circuits small pressure fluctuations, but is interrupted and thus made ineffective in the case of large sudden changes of pressure which shift the piston of the shutoff valve from its center position. However, the consequences of a false blocking of the control pipe can also be avoided by means of a bypass valve which bypass the shutoff valve before and after the shutoff valve is connected to the control pipe and is acted upon by chargingg air pressure as control pressure.

This bypass valve lets the charging air pressure pass by the shutoff valve when it is absolutely necessary to carry out a switching because of the exhaust gas turbo-superchargers. In this case, in order to avoid switching vibrations which are triggered by the charging air fluctuations at the end of a switching process, an enlargement of the switching hysteresis may be accepted because this results in increased load to the concerned exhaust gas turbo-supercharger only in the case of a fast change of the charging air pressure and thus only for a short time.

These and other objects, features and advantages of the present invention will become more apparent from the following description when taken in connection with the accompanying drawing which shows, for purpose of illustration only, several embodiments in accordance with the present invention for a piston internal combustion engine with altogether three exhaust gas turbochargers of which two are engaged, respectively, disengaged as a function of the magnitude of the charging air pressure, and wherein.

Figure 3:
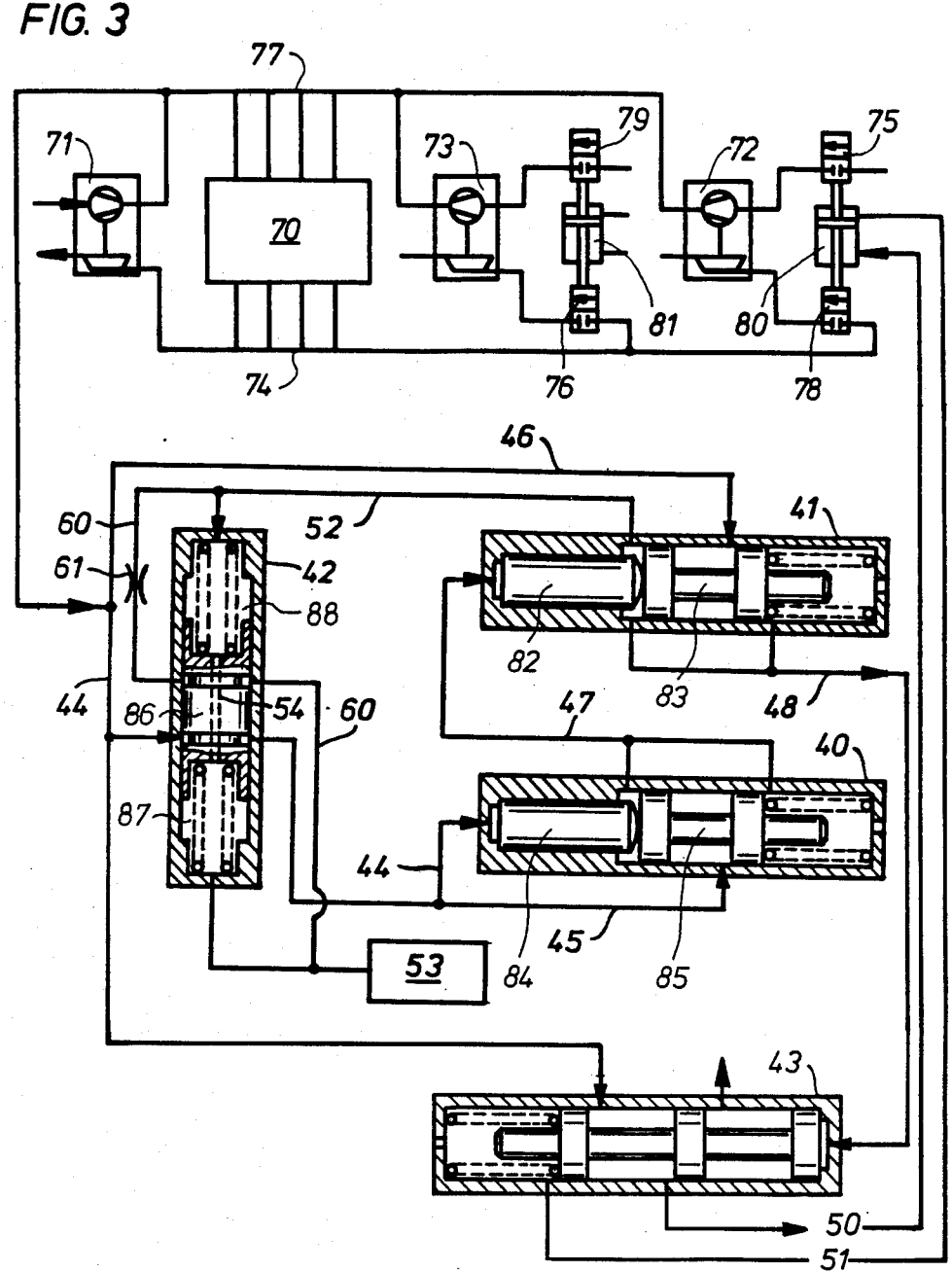
Figure 4:
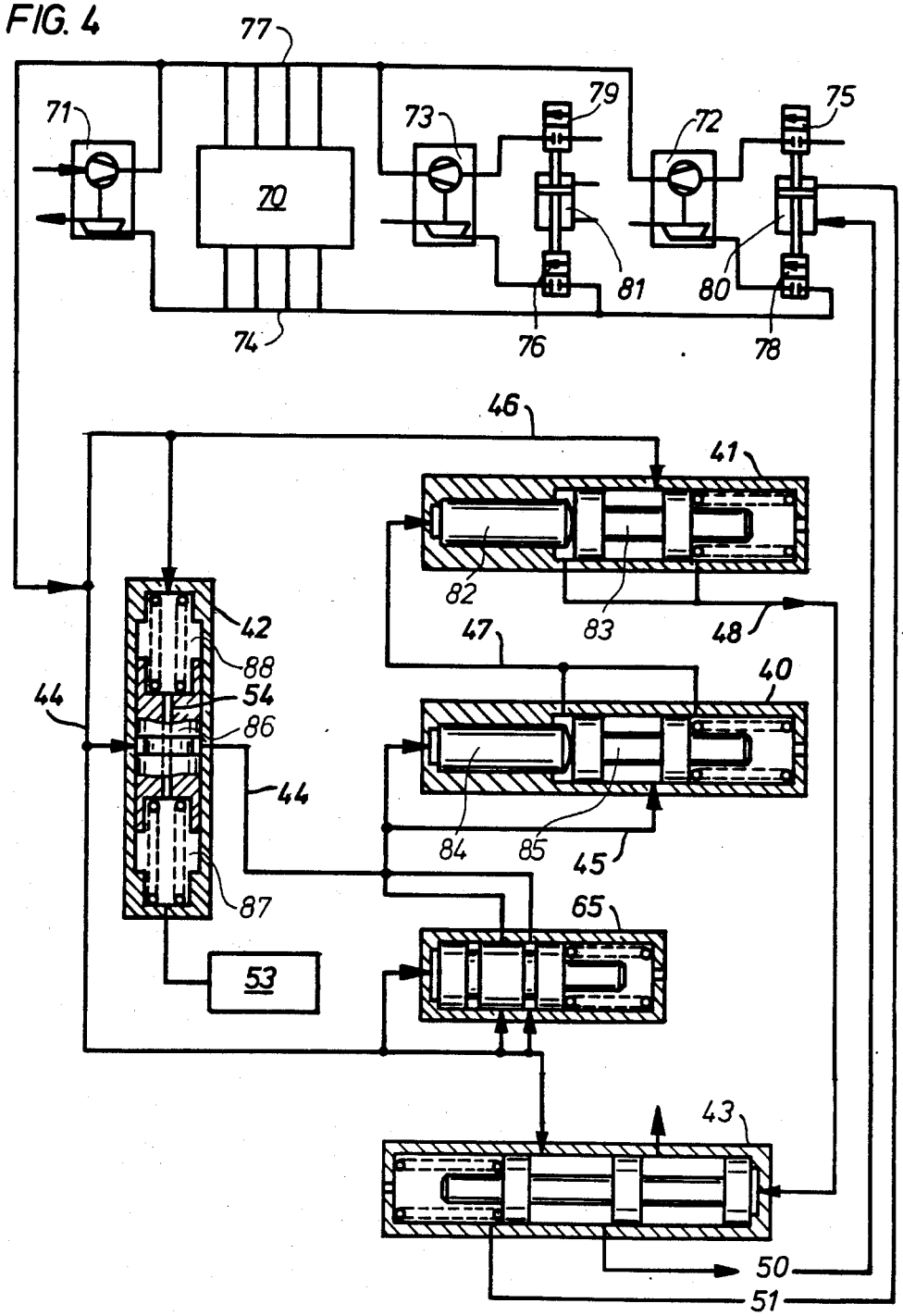

FIG. 3 is a schematic view of a control system in accordance with the present invention for the engagement and disengagement of an exhaust gas turbocharger by means of charging air pressure as the control and actuating pressure and with a short-circuit line for avoiding blocking of the control during a fast acceleration or sudden power reduction of the internal combustion engine; and FIG. 4 is a schematic view of a control system in accordance with the present invention for the engagement and disengagement of an exhaust gas turbocharger by means of charging air pressure as the control and actuating pressure and with a bypass valve for switching the control during a fast acceleration or sudden power reduction of the internal combustion engine.

Figure 1:
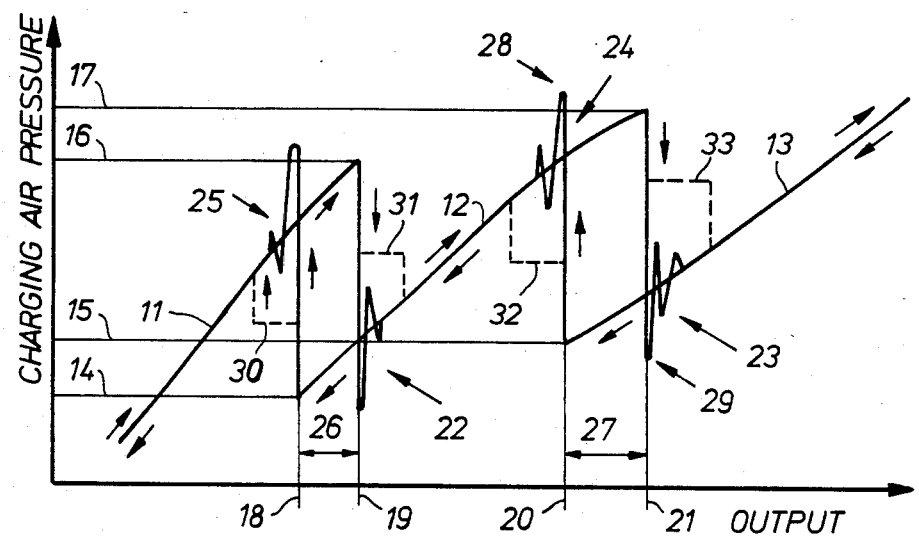
FIG. 1 is a diagram illustrating the curve of the charging air pressure plotted against output of the internal combustion engine.

Referring now to the drawing wherein like reference numerals are used throughout the various views to designate like parts, and more particularly to FIG. 1, a partial curve section 11 represents in this figure the development of the charging air pressure in the lower output range, when the first exhaust gas turbocharger, which is in operation at all times, is acted upon alone by all of the external exhaust gases of the internal combustion engine.

In the middle output range, a charging air pressure development corresponding to the partial curve section 12 is achieved by parallel operation of the first exhaust gas turbocharger with an additionally engaged second exhaust gas turbocharger.

In the upper output range, a charging air pressure development corresponding to a partial curve section 13 results from the engagement of all three exhaust gas turbochargers.

With an increasing output of the piston internal combustion engine, the charging air pressure rises during operation with the first exhaust gas turbocharger corresponding to the partial curve section 11. Upon reaching a charging air pressure 16 which occurs at an output 19, the second exhaust gas trubocharger is additionally engaged by opening its exhaust-gas and charging-air closure devices. As a result thereof, the charging air pressure drops off to the partial curve section 12. Oscillations 22 of the charging air pressure result from the additional engaging operation of the second turbocharger.

With a increasing engine output, the charging air pressure rises corresponding to the partial curve section 12. Upon reaching a charging air pressure 17, which occurs at an output 21, the third exhaust gas turbocharger is additionally engaged by opening its exhaust-gas and charging-air closure devices. As a result thereof, the charging air pressure drops off to the partial curve section 13. Oscillations 23 of the charging air pressure result from the additional engaging operation of the third turbocharger.

With a further increasing engine output, the charging air pressure rises corresponding to the partial curve section 13.

Starting from the maximum output, the charging air pressure decreases with decreasing engine output corresponding to the partial curve section 13. When reaching a charging air pressure 15, which occurs at an output 20, the third exhaust gas turbocharger is again disconnected by closing its exhaust-gas and charging-air closure devices. As a result thereof, the charging air pressure rises to the partial curve section 12. Oscillations 24 of the charging air pressure result from the disengaging operation.

With a further decreasing output, the charging air pressure drops off corresponding to the partial curve section 12. Upon reaching a charging air pressure 14, which results at an output 18, the second exhaust gas turbocharger is disconnected by closing its exhaust-gas and charging-air closure devices. As a result thereof, the charging air pressure rises to the partial curve section 11. Oscillations 25 of the charging air pressure result from the disconnecting operation. With a further decreasing output, the charging air pressure drops off corresponding to the partial curve section 11.

In order to avoid shifting oscillations or hunting operations, a hysteresis 26 is coordinated between the output 19 for the engagement and the output 18 for the disengagement of the second exhaust gas turbocharger, and a hysteresis 27 between the output 21 for the engagement and the output 20 for the disengagement of third exhaust gas turbocharger.

However, these hysteresis values do not suffice to avoid shifting oscillations or hunting by reason of the oscillations 22 to 25. Thus, for example, the charging air pressure, which is reached by the swings 28 of the oscillations 24 during disconnection of the third exhaust gas turbocharger with a decreasing output, exceeds the charging air pressure 17, at which with increasing output an additional engagement is initiated. In order to avoid the re-engagement, the hysteresis 27 would have to be enlarged to such an extent that the largest possible swings 28 of the oscillations 24 would come to lie below the charging air pressure 17 and the largest negative swings 29 of the oscillations 23 would come to lie above the charging air pressure 15. Such an enlargement of the hysteresis is not permissive for the reasons mentioned hereinabove.

In order to avoid a shifting back of the control system into the condition prior to a shifting operation by reason of the oscillations 22 to 25, the control line leading to the control system is temporarily closed off during a shifting operation with the aid of a closure valve by the proposed measures of the present invention so that the oscillations cannot be effective on the control. As a result thereof, deviations 30 to 33, illustrated in dash line, of the development of the control pressure with respect to the chargin air pressure are obtained.

The control for the engagement and disengagement of the second exhaust gas turbocharger is illustrated in the following figures as an example, and more particularly in the disconnected position.

Figure 2:
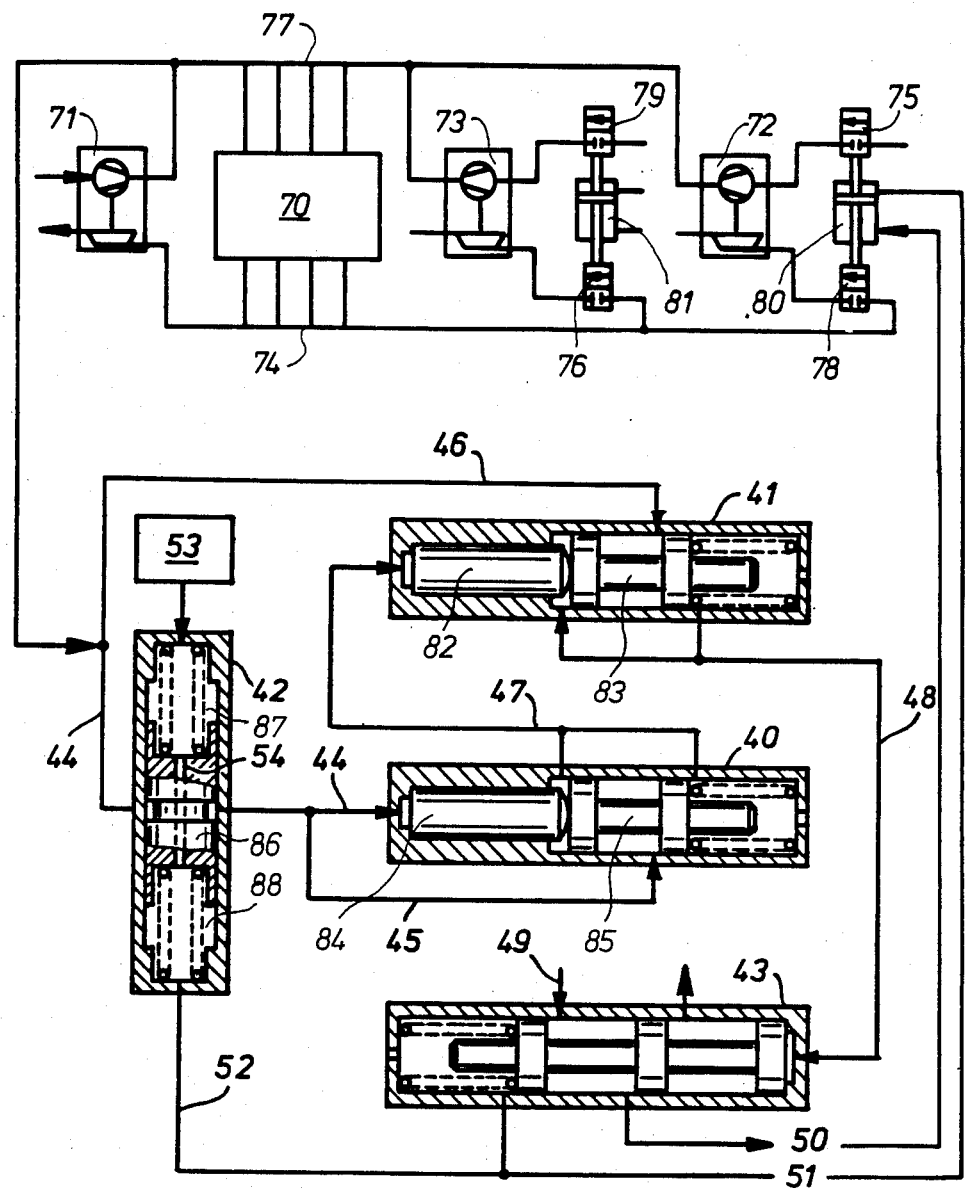
FIG. 2 is a schematic view of a control system in accordance with the present invention for the engagement and disengagement of an exhaust gas turbocharger by means of charging air pressure as the control pressure and of compressed air as the actuating pressure.

In FIGS. 2 to 4, an internal-combustion engine 70 is charged by a permanently connected first exhaust gas turbo-supercharger 71, a disconnectible second exhaust gas turbo-supercharger 72 and a disconnectible third exhaust gas turbo-supercharger 73. An exhaust gas pipe 74 supplies the turbine of the exhaust gas turbo-supercharger 71 directly with exhaust gas and supplies the turbines of the exhaust gas turbo-superchargers 72 and 73 with exhaust gas via exhaust gas shutoff valves 78 and 76. A charging air pipe 77 of the internal-combustion engine 70 is supplied with charging air by the compressors of the exhaust gas turbo-superchargers 71 to 73. The compressors of the exhaust gas turbo-superchargers 72 and 73 may be shut off by charging air shutoff valves 75 and 79.

The shutoff valves 75 and 78 of the exhaust gas turbo-supercharger 72 are actuated by an actuator 80 and the shutoff valves 76 and 79 of the exhaust gas turbo-supercharger 73 are actuated by an actuator 81.

The control for the cylinder 80 of the second exhaust gas turbo-supercharger in FIGS. 2 to 4 consists mainly of two distributing regulators 40 and 41 and a relay valve 43. A shutoff valve 42 is arranged between this control arrangement and the internal-combustion engine 70.

External compressed air in FIG. 2 is used for the actuating of the cylinder 80, said compressed air being supplied to the relay valve 43 in a pipe 49.

In FIGS. 3 and 4, the charging air pressure of the internal-combustion engine is used for the actuating of the cylinder 80, said charging air pressure in each case also being supplied to the relay valve 43.

In FIG. 2, the charging air pressure that exists in the charging air pipe 77, is applied via pipe 44 to the regulating distributor 40 and via a pipe 46 to the regulating distributor 41. The two distributing regulators 40 and 41 are connected with one another via a pipe 47, and the regulating distributor and the relay valve 43 are connected with one another via an actuating pipe 48. The relay valve 43 is connected with the cylinder 80 via two actuating pipes 50 and 51 and with the shutoff valve 42 via a pipe 52.

The regulating distributor 40 has a piston 84 with a small diameter and a piston 85 with a larger diameter at its ends. The control valve 41 has a piston 82 with a small diameter and a piston 83 with a larger diameter at its ends.

The shut-off valve 42 has a piston 86 which, in its inoperative position determined by the force of two springs, keeps open the control pipe 44 for the passage of the charging air, but in its two end positions blocks this control pipe 44. The piston 86 has a throttling bore 54. The piston 86, with the housing of the shutoff valve 42, in each case forms a first working space 87 that is connected with the equalizing space 53, and a second working space 88 acted upon by a control pressure coming from line 52.

Method of Operation:

It will be assumed in this case that the internal-combustion engine is operated with low power and a correspondingly low amount of occurring exhaust gas. In this case, only the permanently connected first exhaust gas turbo-supercharger 71 is in operation. The exhaust gas turbo-superchargers 72 and 73 are inoperative by means of the blocking of their exhaust gas supply pipes and their charging air supply pipes.

By increasing the supplied amount of fuel to the internal-combustion engine, the power delivery amount of exhaust gas and thus the driving energy for the first exhaust gas turbo-supercharger 71 will rise. As a result, the charging air pressure rises corresponding to Curve 11 in FIG. 1. This charging air pressure, via the pipe 44, affects the piston of the valve 40 and shifts it against the spring force until the charging air pressure 16 (FIG. 1) is reached, to connect pipe 45 with the pipe 47. As a result, the pistons 82 and 83 of the regulating distributor 41, which are the same size as pistons 84, 85, respectively, but have a weaker spring than the regulating distributor 40, are shifted into a different end position so that the pipe 46 is connected with the actuating pipe 48. By means of the pressure in the actuating pipe 48, the piston of the relay valve 43 is shifted into its other end position and pressure source in pipe 49 is connected with the actuating pipe 51. As a result, the piston of the cylinder 80 is brought into its other end position and as a result the shut-off valves 78 and 75 are opened. As a result, exhaust gas flows into the turbine of the second exhaust gas turbo-supercharger 72 and this exhaust gas turbo-supercharger charges the internal-combustion engine 70 together with the first exhaust gas turbo-supercharger 71.

During the switching, the pressure 16 of the charging air existing in the pipe 47 and 44 acts upon the pistons 82 and 84 of the control valves 41 and 40. After the switching of the two control valves, the charging air pressure 15 acts upon the front left hand end surface of the pistons 83 and 85 with the larger diameter. As a result, the decrease of the charging air pressure from 16 to 15 (see FIG. 1) caused by the connection of the second exhaust gas turbo-supercharger is compensated and the pistons of the control valves 41 and 40 remain in the position for the connection of the second exhaust gas turbo-supercharger 72.

In order to eliminate the vibrations 22 (FIG. 1) the control pipe 44 is blocked by means of the shutoff valve 42 as follows: the pressure rise in the actuating pipe 51, pipe 52 connected with it, and in the second working space 88 of the shutoff valve 42 is increased and the piston 86 is shifted upwardly out of its shown center position and thus the control pipe 44 is blocked. Thus, the vibrations can no longer affect the control valves 40 and 41. Only after the cessation of the vibrations is the shifting of the piston 86 restored by means of the pressure equalization taking place via the throttle 54 between the first working space 87 and the second working space 88. The duration of the interruption may be predetermined or influenced by the dimensions of the throttle and the equalizing space 53. A reduction of the diameter of the throttle 54 or an enlargement of the equalizing space 53 in each case result in an extension of the blocking time.

In the case of a decreasing charging air pressure along the curve segment 12 (FIG. 1), when the charging air pressure 14 is reached, the pistons of the distributing regulator 41 by means of the force of the spring are again pushed into the position as shown in FIG. 2. The piston of the distributing regulator 40 reaches this position somewhat earlier because the spring of this distributing regulator is stronger. However, the return of regulators 40 and 41 do not themselves cause a disconnection of turbo-supercharger 72. The shift causes actuating pipe 48 to be connected to the spring chamber wherein it is discharged, and the piston of the relay valve 43 by means of the spring force is also moved to the position of FIG. 2. As a result, the actuating pipe 50 is acted upon by compressed air from the pipe 49 and via the cylinders 80, the exhaust gas and charging air guiding valves 78 and 75 are closed and thus the second exhaust gas turbo-supercharger 72 is disconnected. By means of the relay valve, the pipes 51 and 52 are relieved through spring chamber of relay 43 and as a result the piston 86, in a way that is similar to that mentioned above, is temporarily brought out of its equilibrium in the downward direction and the control pipe 44 is blocked until the vibrations 25 have ceased.

The control arrangements in FIGS. 3 and 4 operate according to the same principle as the control arrangement according to FIG. 2. Parts carrying out the same function have the same number.

The main difference is the fact that in the case of FIGS. 3 and 4, the charging air pressure serves not only as the control quantity for the control valves 40 and 41 but also as the actuating fluid for cylinder 80 and thus the opening and closing force for the shutoff valves in the exhaust gas and charging air pipes of the exhaust gas turbo-supercharger.

The charging air pressure is used also as control means for the control of the shutoff valve 42 and the above-mentioned difficulties occur that in the case of a fast acceleration or sudden reduction of power of the internal-combustion engine, the shutoff valve 42 responds because of the resulting charging pressure change and thus, in the case of these operational conditions, no switchings take place.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A control system for the engagement and disengagement of at least one exhaust has turbocharger means of a piston internal combustion engine having an exhaust-gas and a charging-air line for the exhaust gas turbocharger means, closure means for opening and closing said exhaust-gas and charging-air lines to cause engagement and disengagement of the exhaust-gas turbocharger means, said control system being operable to control a working medium for the actuation of the closure means and being supplied with and responsive to magnitudes of charging air pressure of the piston internal combustion engine in a control line means connected between the internal combustion engine and said control system, said control system comprising means for closing the control like means after each engagement and disengagement of the exhaust gas turbocharger means caused by the closure means and for reopening the control line means after passage of a predeterminable time period.

2. A control system according to claim 1, wherein the means closing the control line means is actuated as a function of a pressure increase or pressure decrease in the working medium.

3. A control system according to claim 1, wherein the means closing the control line means is actuated by a change of the charging air pressure caused by engagement or disengagement of the exhaust gas turbocharger.

4. A control system accoridng to claim 2, wherein the means for closing the control line includes a housing means, a piston means arranged in said housing means and having two end faces, spring means biasing the piston to a normal position to open the control line means for the passage of the charging air to said closure means, the first end face of the piston means being directly acted upon by the pressure of at least one of the working medium and charging air pressure, and the second end face being acted upon by said pressure by way of a throttle with a difference in these two pressures moving the piston to close the control line, and an expansion space means connected to the second end face of the piston means.

5. A control system according to claim 4, wherein the charging air pressure of the piston internal combustion engine is used as working medium for the actuation of the closure means, the piston means in its normal position opening a further connecting line between its two end face pressure spaces, said further connecting line being controllable by a throttle means.

6. A control system according to claim 4, further comprising a bypass valve means operable to cause charging air to bypass the piston means and cause actuation of the closure valve structure.

7. A control system according to claim 1, wherein the means for closing the control line comprises a shutoff valve for the control line which has a piston portion arranged in a housing, said piston portion forming two working spaces with the housing and biased into an inoperative position by spring force to open the control line for the passage of the charging air to the closure means, the piston in an operative position blocking the control line for the passage of charging air to the closure means, the two working spaces being connected with one another via a throttle means, the first working space being connected with an equalizing space and wherein the second working space is connected to a source of pressure operable to shift the piston to its inoperative position.

8. A control system according to claim 7, wherein the connection to the source of pressure constitutes a connection to the working medium.

9. A control system according to claim 7, wherein the connection to the source of pressure constitutes a connection to the charging air pressure of the internal-combustion engine.

10. A control system according to claim 7, wherein the two working spaces of the shutoff valve are connected via a conduit containing a second throttle and wherein the conduit is blocked when the piston moves from its inoperative position.

11. A control according to claim 7, including a bypass valve which bypasses working medium around the shutoff valve from the control line to the closure means and being acted by charging air pressure.

* * * * *